(12) United States Patent
Mochizuki et al.

(10) Patent No.: US 9,284,014 B2
(45) Date of Patent: Mar. 15, 2016

(54) DAMPER

(75) Inventors: Takahisa Mochizuki, Kani (JP); Yuuki Amano, Kakamigahara (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 13/813,546

(22) PCT Filed: Nov. 4, 2011

(86) PCT No.: PCT/JP2011/075474
§ 371 (c)(1),
(2), (4) Date: Jan. 31, 2013

(87) PCT Pub. No.: WO2012/066947
PCT Pub. Date: May 24, 2012

(65) Prior Publication Data
US 2013/0134688 A1    May 30, 2013

(30) Foreign Application Priority Data

Nov. 17, 2010 (JP) ................. 2010-256744

(51) Int. Cl.
| | |
|---|---|
| *F16F 9/34* | (2006.01) |
| *B62K 25/08* | (2006.01) |
| *F16F 9/46* | (2006.01) |
| *B62K 25/04* | (2006.01) |

(52) U.S. Cl.
CPC . *B62K 25/08* (2013.01); *F16F 9/34* (2013.01); *F16F 9/464* (2013.01); *B62K 2025/048* (2013.01); *F16F 2230/18* (2013.01)

(58) Field of Classification Search
USPC ............... 188/282.1, 282.2, 322.13; 280/276
See application file for complete search history.

(56) References Cited

U.S. PATENT DOCUMENTS

2006/0225979 A1* 10/2006 Quinn et al. ............. 188/322.21
2009/0322054 A1* 12/2009 Becker et al. ................. 280/276

FOREIGN PATENT DOCUMENTS

| EP | 1 876 090 A1 | | 1/2008 |
|---|---|---|---|
| JP | 62-015007 U | | 1/1987 |
| JP | 2005-140262 A | | 6/2005 |
| JP | 2008-014431 A | | 1/2008 |
| JP | 2009-115254 A | | 5/2009 |
| JP | 2009115254 A | * | 5/2009 |

* cited by examiner

*Primary Examiner* — Joseph Rocca
*Assistant Examiner* — Felicia L Brittman
(74) *Attorney, Agent, or Firm* — Rabin & Berdo, P.C.

(57) ABSTRACT

Damper is provided with damper main body including cylinder, piston being slidably inserted into cylinder to partition interior of cylinder into extension and compression chambers, and piston rod being inserted into cylinder to be coupled to piston, and damping force adjustment mechanism including flow path permitting passage of fluid only during either extension or contraction, valve seat being provided at intermediate position of flow path, valve body being movable back and forth relative to valve seat, and motor driving and moving valve body back and forth relative to valve seat to adjust flow path area of flow path. Damper energizes motor to move valve body distance, which is two-fold or more of distance from separated position where valve body is separated from valve seat to seated position where valve body is seated on valve seat, when flow path is blocked by moving valve body from separated position to seated position.

6 Claims, 4 Drawing Sheets

FIG. 4

| | | MOVEMENT OF VALVE BODY | | | |
|---|---|---|---|---|---|
| | | MAXIMALLY RETRACTED POSITION | PRESENT POSITION | DESIRED POSITION | SEATED POSITION |
| VIBRATION PATTERN | STEP 1 | ←――――― | | | |
| | STEP 2 | ――――――――――――→ | | | |
| | STEP 3 | | | ←――― | |

DAMPER

TECHNICAL FIELD

The present invention relates to a damper.

BACKGROUND ART

A damper is built in a front fork of a two-wheel vehicle and adjusts a damping force by a motor. JP2008-14431 discloses a damper including a damper main body with a cylinder, a piston and a piston rod, a passage, a needle valve and a stepping motor.

The cylinder is coupled to an outer tube. The piston is slidably inserted into the cylinder to partition the interior of the cylinder into a compression side chamber and an extension side chamber. The piston rod is inserted into the cylinder, one end is coupled to an inner tube slidably inserted into the outer tube and the other end is coupled to the piston.

The passage allows communication between the compression side chamber and the extension side chamber of the damper main body. A check valve is provided at an intermediate position of the passage and permits only a flow from the compression side chamber toward the extension side chamber or, conversely, a flow from the extension side chamber toward the compression side chamber. The needle valve is provided at an intermediate position of the passage. The stepping motor is fixed to an other end side of the piston rod and drives the needle valve.

This damper exerts a damping force by applying resistance to the flow of hydraulic oil by a piston valve provided in the piston at the time of extension and exerts a damping force by applying resistance to the flow of hydraulic oil leaking out from the cylinder to a reservoir by a base valve provided on an end part of the cylinder at the time of contraction.

In addition to this, the check valve permits the flow of hydraulic oil in the passage only at the time of extension or at the time of contraction and the needle valve applies resistance to the flow of hydraulic oil. Thus, the check valve and the needle valve exert damping forces in cooperation either at the time of extension or at the time of contraction of the damper. Further, the motor drives the needle valve, thereby making the damping force of the needle valve variable.

The needle valve fulfills a damping function only when the damper extends or contracts. Normally, a pair of left and right front forks is provided to suspend a wheel of the two-wheel vehicle. Thus, if the needle valve of the damper built in one front fork fulfills the damping function at the time of extension and the needle valve of the damper built in the other front fork fulfills the damping function at the time of contraction, the left and right front forks can adjust damping forces at extension and contraction sides as a whole.

SUMMARY OF THE INVENTION

The above damper can accurately adjust a damping force generated in the damper since a stable flow is ensured by making the flow of hydraulic oil passing through the needle valve constantly one-way.

In the case of blocking the passage by the needle valve, the needle valve has to be driven to overcome a fluid force and a pressure caused by the flow of hydraulic oil in order to block the passage. Thus, to block the passage while the damper is operating and the hydraulic oil is flowing in the passage, it is necessary to use a stepping motor capable of outputting a high torque. To cause the stepping motor to output a high torque, the stepping motor is enlarged and cost thereof increases, thereby sacrificing economic efficiency and vehicle mountability.

In the case of blocking the passage while the hydraulic oil is flowing in the passage, the needle valve can be driven with a relatively low torque immediately before the passage is blocked and there is a low possibility of step-out. Thus, the conventional damper solves the above problem by enabling the use of a stepping motor with a relatively low maximum torque by avoiding complete blockage of the passage.

However, since the above damper cannot completely block the passage, a flow path variable range of the needle valve becomes inevitably smaller. Thus, a damping force adjustment range of the damper becomes smaller and, if the stepping motor steps out during running, it cannot be corrected during running and the damping force cannot be correctly adjusted.

This invention aims to provide a damper capable of correcting a step-out and improving a damping force adjustment range while enabling the use of a low-cost and small-size motor.

According to one aspect of the present invention, a damper is provided which comprises a damper main body including a cylinder, a piston which is slidably inserted into the cylinder to partition the interior of the cylinder into an extension side chamber and a compression side chamber, and a piston rod which is inserted into the cylinder to be coupled to the piston; and a damping force adjustment mechanism including a flow path which permits the passage of a fluid only either during the extension of the damper main body or during the contraction of the damper main body, a valve seat which is provided at an intermediate position of the flow path, a valve body which is movable back and forth relative to the valve seat, and a motor which drives and moves the valve body back and forth relative to the valve seat to adjust a flow path area of the flow path; wherein the motor is energized to move the valve body a distance, which is two-fold or more of a distance from a separated position where the valve body is separated from the valve seat to a seated position where the valve body is seated on the valve seat, when the flow path is blocked by moving the valve body from the separated position to the seated position.

Embodiments of the present invention and advantages thereof are described in detail below with reference to the accompanying drawings.

BRIEF DESCRIPTION OF DRAWINGS

FIG. 4 is a chart showing a drive pattern of a valve body of the damper according to the embodiment of the present invention.

EMBODIMENTS OF THE INVENTION

Figure 1:
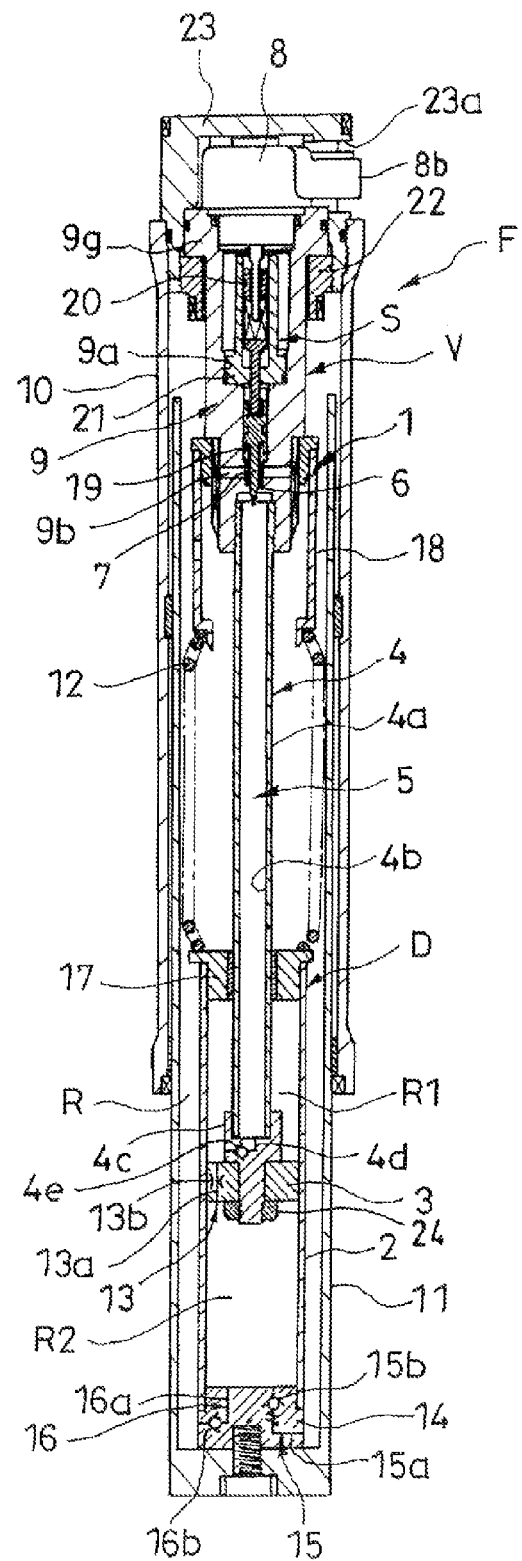
FIG. 1 is a sectional view of a damper according to an embodiment of the present invention.

As shown in FIG. 1, a damper 1 in this embodiment includes a damper main body D with a cylinder 2, a piston 3 and a piston rod 4 and a damping force adjustment mechanism V with a flow path 5, a valve seat 6, a valve body 7 and a motor 8.

The piston 3 is slidably inserted into the cylinder 2 to partition the interior of the cylinder 2 into an extension side chamber R1 and a compression side chamber R2. The piston rod 4 is inserted into the cylinder 2 to be coupled to the piston 3. The flow path 5 permits the passage of a fluid only when the damper main body D extends. The valve seat 6 is provided at an intermediate position of the flow path 5. The valve body 7 is movable back and forth relative to the valve seat 6. The motor 8 adjusts a flow path area by driving and moving the valve body 7 back and forth relative to the valve seat 6.

Each component is described in detail below. The damper main body D is housed in a front fork F formed by a vehicle body side tube 10 and an axle side tube 11. The vehicle body side tube 10 is coupled to a body of a saddled vehicle such as a two-wheel vehicle together with the piston rod 4. The axle side tube 11 is coupled to an unillustrated axle of the saddled vehicle and slidably inserted into the vehicle body side tube 10.

The piston rod 4 is coupled to the vehicle body side tube 10 and the cylinder 2 is coupled to the axle side tube 11. The damper main body D is housed in the front fork F closed by the vehicle body side tube 10 and the axle side tube 11 so as to be interposed between the vehicle body side tube 10 and the axle side tube 11. In this embodiment, the front fork F is an inclined front fork in which the axle side tube 11 is inserted in the vehicle body side tube 10. Conversely, the front fork F may be an upright front fork in which the vehicle body side tube 10 is inserted in the axle side tube 11.

A suspension spring 12 is interposed between the piston rod 4 and the cylinder 2 of the damper main body D, and exerts an elastic force in a direction to separate the vehicle body side tube 10 and the axle side tube 11 via the damper main body D, i.e. in an extension direction of the front fork F. The suspension spring 12 elastically supports the body of the saddled vehicle.

The damper main body D built in the front fork F is described in detail. As shown in FIG. 1, the damper main body D includes the cylinder 2, the piston 3, the piston rod 4, a damping passage 13 and a bottom member 14.

The cylinder 2 is coupled to the axle side tube 11. The piston 3 is slidably inserted into the cylinder 2 to partition the interior of the cylinder 2 into the extension side chamber R1 and the compression side chamber R2 that are two working chambers. One end of the piston rod 4 is coupled to the piston 3 and the other end thereof is coupled to the vehicle body side tube 10.

The damping passage 13 is provided in the piston 3, allows communication between the extension side chamber R1 and the compression side chamber R2 and applies resistance to the flow of a passing fluid. The bottom member 14 includes a compression side damping passage 15 and a suction passage 16. The compression side damping passage 15 is provided in the lower end of the cylinder 2 and applies resistance to the flow of the fluid from the compression side chamber R2 toward a reservoir R. The suction passage 16 permits only the flow of the fluid from the reservoir R toward the compression side chamber. A liquid such as hydraulic oil is filled as the fluid in the extension side chamber R1 and the compression side chamber R2 and a liquid and a gas are filled in the reservoir R.

The cylinder 2 is fixed to a bottom part of the axle side tube 11 in the form of a bottomed tube via the bottom member 14 fitted in the lower end of the cylinder 2. A rod guide 17 slidably supporting the piston rod 4 is provided on the upper end of the cylinder 2. The piston rod 4 is tubular and includes a piston rod main body 4a with a hollow portion 4b, and a piston coupling portion 4c fixed to the lower end of the piston rod main body 4a in FIG. 1 and holding the piston 3. The upper end of the piston rod main body 4a in FIG. 1 is fixed to the upper end of the vehicle body side tube 10 via a valve housing 9 housing the valve body 7 of the damping force adjustment mechanism V. The piston coupling portion 4c includes a communication path 4d which allows communication between the hollow portion 4b and the extension side chamber R1, and a check valve 4e which is provided at an intermediate position of the communication path 4d and permits only the flow of the liquid from the extension side chamber R1 toward the hollow portion 4b. The annular piston 3 is fixed to the lower end of the piston rod 4 in FIG. 1 using a piston nut 24.

The suspension spring 12 is interposed between the rod guide 17 and a tubular spring bearing 18 provided on the outer periphery of the valve housing 9 and biases the damper main body D in an extension direction. In this way, the front fork F is also biased in the extension direction.

The piston 3 is fixed to the lower end of the piston rod 4 in FIG. 1. The damping passage 13 provided in the piston 3 includes a passage 13a which allows communication between the extension side chamber R1 and the compression side chamber R2 and a damping valve 13b which is provided at an intermediate position of the passage 13a and applies resistance to the flow of the passing liquid. In this embodiment, the damping valve 13b is a throttle valve or the like and the damping passage 13 permits both the flow of the liquid from the extension side chamber R1 toward the compression side chamber R2 and the flow of the liquid from the compression side chamber R2 toward the extension side chamber R1. Instead of this, two or more passages may be provided, a damping valve for permitting only the flow of the liquid from the extension side chamber R1 toward the compression side chamber R2 may be provided in some of the passages and a damping valve for permitting only the flow of the liquid from the compression side chamber R2 toward the extension side chamber R1 may be provided in the other passages.

The reservoir R is formed between the damper main body D and the front fork F, and the liquid and the gas are filled in the reservoir R. The compression side damping passage 15 formed in the bottom member 14 includes a passage 15a which allows communication between the compression side chamber R2 and the reservoir R and a damping valve 15b which permits only the flow of the liquid from the compression side chamber R2 toward the reservoir R and applies resistance to the flow of the passing liquid. The compression side damping passage 15 is a one-way passage which allows only the flow of the liquid from the compression side chamber R2 toward the reservoir R.

The suction passage 16 formed in the bottom member 14 includes a passage 16a which allows communication between the compression side chamber R2 and the reservoir R and a check valve 16b which allows only the flow of the liquid from the reservoir R toward the compression side chamber R2. The suction passage 16 is a one-way passage which allows only the flow of the liquid from the reservoir R toward the compression side chamber R2 in a direction opposite to that in the compression side damping passage 15.

The damping force adjustment mechanism V is described. The damping force adjustment mechanism V includes the flow path 5, the valve seat 6, the valve body 7 and the motor 8. The flow path 5 allows communication between the extension side chamber R1 and the reservoir R and permits only the flow of the liquid from the extension side chamber R1 toward the reservoir R. The valve seat 6 is provided at the intermediate position of the flow path 5. The valve body 7 is movable back and forth relative to the valve seat 6. The motor 8 drives and moves the valve body 7 back and forth relative to the valve seat 6, thereby being able to adjust a flow path area.

The flow path 5 is composed of the hollow portion 4b, the communication path 4d, a hollow portion 9a and a horizontal hole 9b. The hollow portion 4b and the communication path 4d are provided in the piston rod 4. The hollow portion 9a is provided in the valve housing 9 coupled to the upper end of the piston rod 4 in FIG. 1 and communicates with the hollow portion 4b. The horizontal hole 9b allows communication between the hollow portion 9a and the reservoir R. The flow path 5 allows communication between the extension side chamber R1 and the reservoir R and permits only the passage of the liquid from the extension side chamber R1 toward the reservoir R by the check valve 4e provided at the intermediate position of the communication path 4d.

The check valve for setting the flow path 5 one-way may be provided at another position instead of being provided in the piston coupling portion 4c. For example, the check valve may be provided in the hollow portion 4b of the piston rod main body 4a or provided at an opening end of the hollow portion 4b at the upper end of the piston rod main body 4a in FIG. 1.

Figure 2:
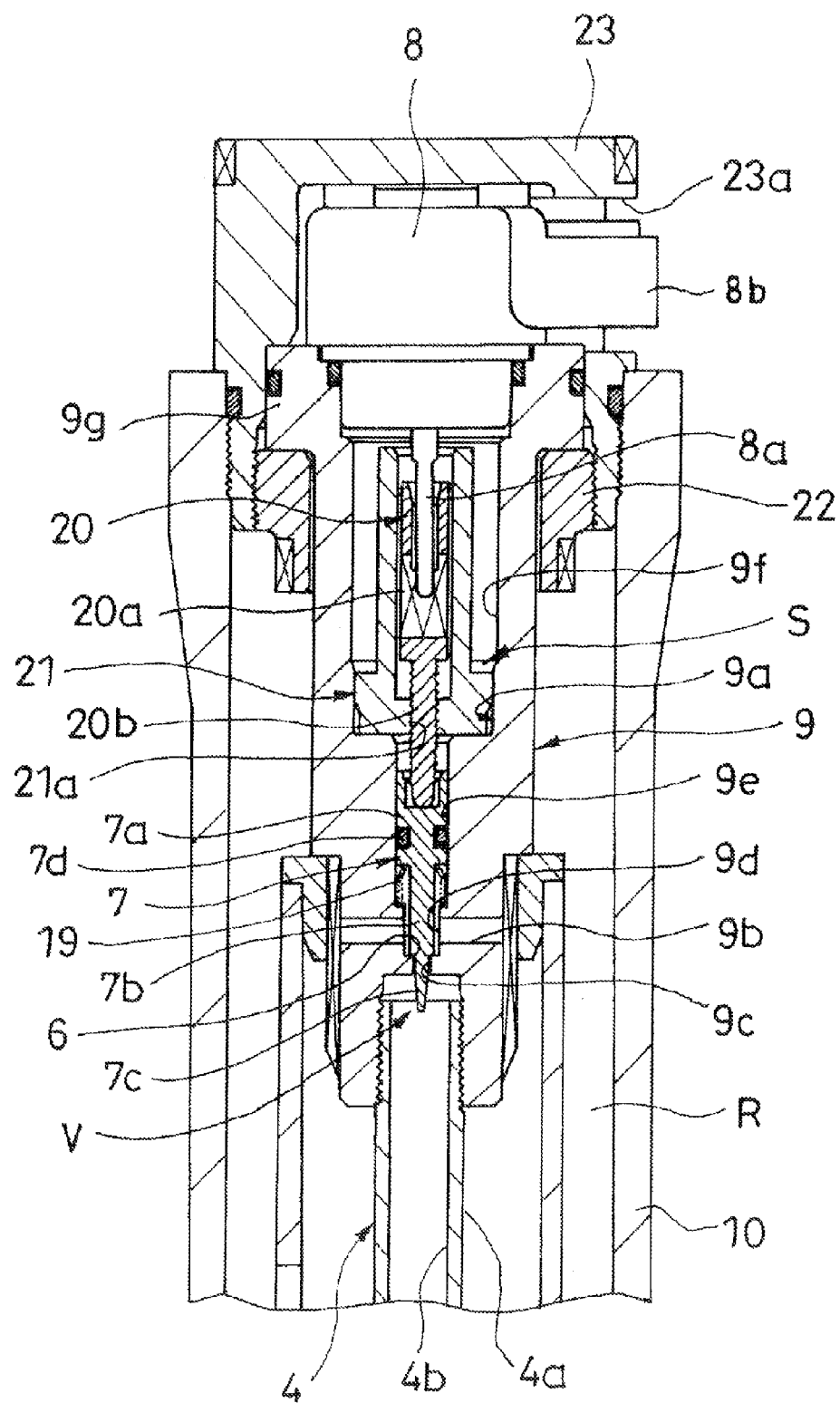
FIG. 2 is an enlarged sectional view showing a cross-section of a damping force adjustment mechanism of the damper according to the embodiment of the present invention.

As shown in FIG. 2, the valve housing 9 is tubular and includes the hollow portion 9a formed inside, the horizontal hole 9b that is open sideways and communicates with the hollow portion 9a, and a flange 9g provided on the outer periphery. The hollow portion 9a includes a small-diameter portion 9c, a horizontal hole crossing portion 9d, a valve housing portion 9e and a large-diameter portion 9f. The small-diameter portion 9c is formed by reducing the inner diameter of a lower side of the hollow portion 9a in FIG. 1 located closer to the piston rod than a part of the hollow portion 9a crossing the horizontal hole 9b. The horizontal hole crossing portion 9d communicates with the small-diameter portion 9c, has a larger inner diameter than the small-diameter portion 9b and crosses the horizontal hole 9b. The valve housing portion 9e has a larger inner diameter than the horizontal hole crossing portion 9d and the valve body 7 is slidably inserted therein. The large-diameter portion 9f has a larger inner diameter than the valve housing portion 9e. The valve seat 6 is formed on a step part on a boundary between the small-diameter portion 9c and the horizontal hole crossing portion 9d. That is, the valve seat 6 is formed in the valve housing 9.

The valve body 7 is composed of a trunk portion 7a, a valve portion 7b, a valve head 7c and a seal ring 7d. The trunk portion 7a is in slidable contact with the valve housing portion 9e. The valve portion 7b extends from the trunk portion 7a toward the valve seat 6 and has an outer diameter smaller than the trunk portion 7a and larger than the inner diameter of the small-diameter portion 9c. The valve head 7c is a needle-type valve head 7c extending from the lower end of the valve portion 7b in FIG. 1, which is a leading end, and insertable into the small-diameter portion 9c. The seal ring 7d is an annular seal ring 7d which is mounted on the outer periphery of the trunk portion 7a and in slidable contact with the inner periphery of the valve housing portion 9e. A coil spring 19 is interposed between the lower end of the trunk portion 7a in FIG. 1 and a step part on a boundary between the horizontal hole crossing portion 9d and the valve housing portion 9e in the hollow portion 9a and biases the valve body 7 in a direction away from the valve seat 6.

The valve body 7 is housed in the hollow portion 9a to be movable back and forth in an axial direction relative to the valve seat 6 and driven by the motor 8 to move back and forth relative to the valve seat 6. When the valve body 7 is driven by the motor 8 and the outer periphery of the lower end of the valve portion 7b in FIG. 1 facing the valve seat 6 is seated on the valve seat 6, the flow path 5 is blocked as shown in FIG. 2.

When the valve body 7 is driven in the direction away from the valve seat 6 in a blocked state shown in FIG. 2, the valve portion 7b is separated from the valve seat 6 to form a clearance, thereby releasing the flow path 5.

In a state where the valve portion 7b and the valve seat 6 are separated and the flow path 5 is released, the clearance between the valve head 7c and the inner edge of the valve seat 6 becomes larger as the valve portion 7b is separated more from the valve seat 6 and the flow path area of the flow path 5 changes according to this. That is, the flow path area of the flow path 5 changes according to a positional relationship of the valve body 7 and the valve seat 6. The flow path area of the flow path 5 is maximized when the valve body 7 is most distant from the valve seat 6, and the flow path 5 is completely blocked and the flow path area becomes 0 when the valve body 7 is seated on the valve seat 6, i.e. when the valve portion 7b is in contact with the valve seat 6. When the flow path 5 is in a released state, the extension side chamber R1 and the reservoir R are allowed to communicate. When the damper 1 extends, the liquid passes through the flow path 5 and is discharged to the reservoir R, whereby resistance is applied to the flow of the liquid according to the flow path area of the flow path 5.

Next, a drive part for moving the valve body 7 back and forth relative to the valve seat 6 is described. As described above, the valve body 7 is driven by the motor 8. A feed screw mechanism S is interposed between the motor 8 and the valve body 7 and drives the valve body 7 by translating a rotational motion of the motor 8 into a back-and-forth motion of the valve body 7.

The motor 8 is a stepping motor. The feed screw mechanism S is composed of a screw member 20 and a nut member 21. The screw member 20 is so coupled to a shaft 8a of the motor 8 fitted into the large-diameter portion 9f of the hollow portion 9a of the valve housing 9 as to be non-rotatable and movable in an axial direction. The nut member 21 is tubular, has the screw member 20 threadably engaged therewith and is fixed to the large-diameter portion 9f hollow portion 9a.

The screw member 20 is shaft-like and composed of a shaft insertion hole 20a which is open at the motor 8 side end serving as a base end, and a screw portion 20b provided on the outer periphery of an end side opposite to the motor and serving as a leading end. The shaft insertion hole 20a has a cross-section other than a right circular cross-section, and the shaft 8a of the motor 8 is shaped to have a cross-section in conformity with the cross-section of the shaft insertion hole 20a.

The nut member 21 is tubular and fixed to the large-diameter portion 9f of the hollow portion 9a and a screw portion 21a to be threadably engaged with the screw portion 20b of the screw member 20 is provided on the inner periphery. The leading end of the screw member 20 projects from the lower end of the nut member 21 and is in contact with the valve body 7 while the screw member 20 is threadably engaged with the nut member 21.

When the motor 8 is driven, the shaft 8a rotates and the screw member 20 rotates relative to the nut member 21 and moves in a vertical direction in FIG. 1 relative to the nut member 21. The valve body 7 is biased in the direction away from the valve seat 6 by the coil spring 19 as described above. Thus, when the screw member 20 is moved toward the valve seat 6 relative to the nut member 21 by driving the motor 8, the valve body 7 is pushed and moved toward the valve seat 6. On the contrary, when the screw member 20 is moved in the direction away from the valve seat 6 relative to the nut member 21, the valve body 7 is pushed by the coil spring 19 to be retracted from the valve seat 6.

The motor 8 is sandwiched between an annular peripheral nut member 22 and a cap 23 in the form of a tube with a closed top, and fixed to the valve housing 9. The peripheral nut member 22 includes a screw portion on an outer peripheral side and is mounted on the outer periphery of the valve housing 9 and engaged with the flange 9*The* 23 in the form of a tube with a closed top covers an opening end of the valve housing 9 and is threadably engaged with the peripheral nut member 22. The cap 23 includes an opening 23*a* which is open sideways, and causes a connector 8*b* of the motor 8 to be exposed to the outside through the opening 23*a*. The connector 8*b* of the motor 8 and an external power supply can be connected by a power wire through the opening 23*a*, whereby power can be supplied to the motor 8 from the outside of the vehicle body side tube 10.

As described above, the damper 1 applies resistance to the flow of the liquid moving from the extension side chamber R1 compressed by the piston 3 to the compression side chamber R2 in the damping passage 13 and applies resistance to the flow of the liquid from the extension side chamber R1 toward the reservoir R using the damping force adjustment mechanism V at the time of extension when the piston 3 moves upward in FIG. 1 relative to the cylinder 2. That is, the damper 1 exerts an extension side damping force using the damping passage 13 and the damping force adjustment mechanism V at the time of extension. The liquid is supplied to the compression side chamber R2, which is expanded at the time of extension, from the reservoir R via the suction passage 16 provided in the bottom member 14, thereby compensating for a volume change in the cylinder 2 caused by a movement of the piston rod 4 out of the cylinder 2 when the damper 1 extends.

On the contrary, the damper 1 applies resistance to the flow of the liquid moving from the compression side chamber R2, which is compressed by the piston 3, to the extension side chamber R1 in the damping passage 13 at the time of contraction when the piston 3 moves downward in FIG. 1 relative to the cylinder 2. The liquid corresponding to a reduction in the volume in the cylinder 2 caused by the entrance of the piston rod 4 into the cylinder 2 is discharged to the reservoir R via the compression side damping passage 15 of the bottom member 14 to compensate for a volume change in the cylinder 2. Thus, the damper 1 applies resistance to the flow of the liquid even in the compression side damping passage 15. That is, at the time of contraction, the damper 1 exerts a compression side damping force in the damping passage 13 and the compression side damping passage 15 and no liquid flows in the flow path 5. Therefore, the damping force adjustment mechanism V is not involved in the generation of the compression side damping force.

Since the damping force adjustment mechanism V can make the flow path area of the flow path 5 variable by driving the valve body 7, this damper 1 can adjust an extension side damping force at the time of extension.

When the valve body 7 is separated from the valve seat 6 and the flow path 5 is in the released state and when the flow path 5 is completely blocked by driving the valve body 7 to adjust the damping force, the motor 8 is energized for a period required to move the valve body 7 a distance from a separated position where the valve body 7 is separated from the valve seat 6 to a position where the valve body 7 is seated on the valve seat 6. In this case, since the liquid passes along the flow path 5 while the damper 1 is extending, the valve body 7 is subjected to a fluid force and a pressure caused by the flow of the liquid. If the motor is overcome by the fluid force and the pressure and steps out, the valve body 7 can no longer be driven toward the valve seat 6.

Accordingly, in this embodiment, when the valve body 7 is separated from the valve seat 6 and the flow path 5 is in the released state and when the flow path 5 is completely blocked by driving the valve body 7, the motor 8 is energized to move the valve body 7 twice the distance from the separated position where the valve body 7 is separated from the valve seat 6 to the position where the valve body 7 is seated on the valve seat 6. The motor 8 is a stepping motor and driven in accordance with pulse signals of a specific cycle.

Accordingly, the motor 8 only has to be energized over a period corresponding to at least a necessary number of pulse signals to move the valve body 7 twice the distance from the separated position where the valve body 7 is separated from the valve seat 6 to the position where the valve body 7 is seated on the valve seat 6. For example, if a necessary number of pulse signals to move the valve body 7 a distance from the separated position where the valve body 7 is separated from the valve seat 6 to the position where the valve body 7 is seated on the valve seat 6 is 160 and it is possible to generate 80 pulse signals per second, 320 or more pulse signals which are twice as many as pulse signals (160) necessary to move the valve body 7 from the separated position where the valve body 7 is separated from the valve seat 6 to the position where the valve body 7 is seated on the valve seat 6 may be fed to the motor 8. Since an energization period corresponding to 320 pulse signals is 4 seconds, the motor 8 only has to be energized for 4 seconds or longer.

Figure 3:
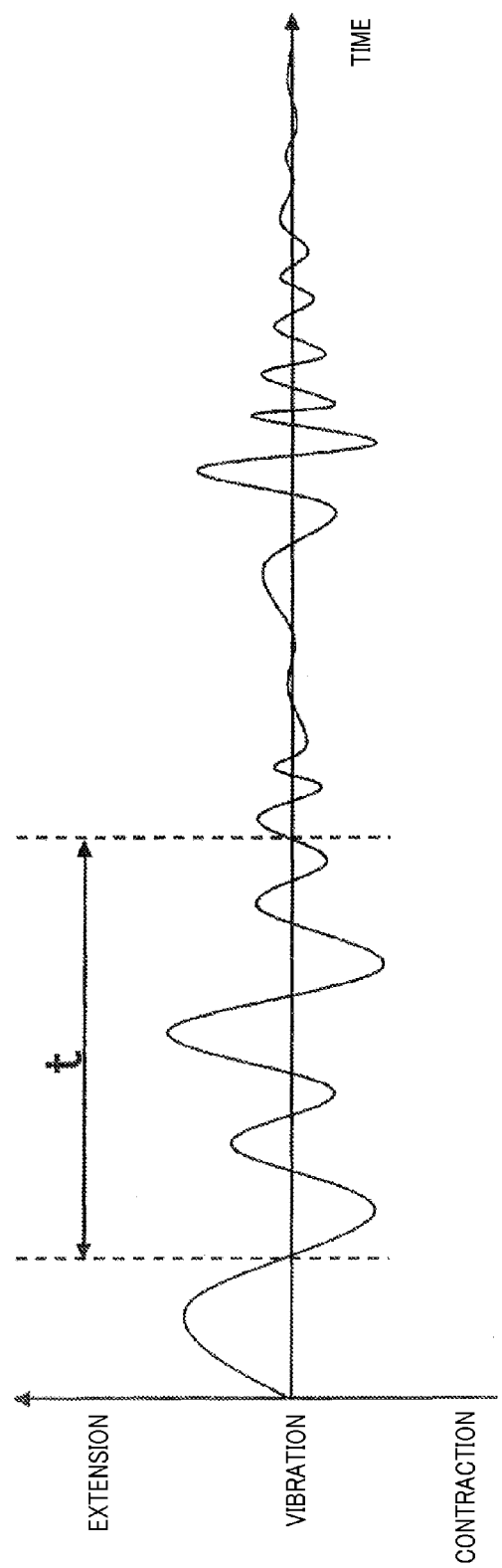
FIG. 3 is a chart showing a vibrating state of the damper according to the embodiment of the present invention.

The damper 1 repeatedly extends and contracts due to vibration input from a road surface during the running of the saddled vehicle. Accordingly, if vibration of the damper 1 during the running of the vehicle is taken out for an arbitrary period t as shown in FIG. 3, an extension movement and a contraction movement appear fifty-fifty. The liquid flows in the flow path 5 only when the damper 1 is extending. As described above, when the damper 1 is vibrating during the running of the saddled vehicle and when the valve body 7 is separated from the valve seat 6 and the flow path 5 is completely blocked by driving the valve body 7 in the released state of the flow path 5, the motor 8 is energized over a period necessary to move the valve body 7 twice the distance from the separated position where the valve body 7 is separated from the valve seat 6 to the position where the valve body 7 is seated on the valve seat 6.

Since the damper 1 is contracting and no liquid is flowing in the flow path 5 during half of the energization period, a fluid force and a pressure during the passage of the liquid do not act on the valve body 7. The energization period to the motor 8 is set at least to a period necessary to drive the valve body 7 twice the distance from the separated position to the position where the valve body 7 is seated on the valve seat 6. That is, the energization period to the motor 8 is set to be equal to or more than two-fold of the period necessary to drive the valve body 7 a distance from the separated position to the position where the valve body 7 is seated on the valve seat 6.

In this way, the energization period to the motor 8 is set to be equal to or more than two-fold of the period necessary to drive the valve body 7 a distance from the separated position to the position where the valve body 7 is seated on the valve seat 6, the liquid does not pass along the flow path 5 for half of the energization period, and the valve body 7 can be driven with no load except for a biasing force of the coil spring 19 during this period. In this way, the valve body 7 can be reliably seated on the valve seat 6 and block the flow path 5. In other words, since the valve body 7 can be reliably seated on the valve seat 6, the step-out of the motor 8 can be corrected by seating the valve body 7. Therefore, the step-out can be corrected also during running.

Since the flow path 5 can be blocked according to the damper 1, a flow path area adjustment range in the damping force adjustment mechanism V becomes larger and a damping force adjustment range also becomes larger, whereby ride quality of the vehicle can be further improved. Further, since the step-out can be corrected also during running, a desired damping force can be accurately generated.

Since a torque required for the motor 8 only has to be of such a degree that the valve body 7 can be pressed toward the valve seat 6 by overcoming the biasing force of the coil spring 19, it needs not be such a high torque as to overcome the fluid force and the pressure of the liquid passing along the flow path 5. Thus, even if a design is made assuming a case where the blockage of the flow path 5 is required, the enlargement of the motor 8 can be avoided. Further, since the enlargement of the motor 8 is avoided, mountability to the saddled vehicle is improved and there is a cost advantage.

When the valve body 7 is retracted from the valve seat 6 and when the damper 1 contracts and the valve body 7 is in a no-load state, the fluid force and the pressure of the liquid passing along the flow path 5 act in a direction to retract the valve body 7 from the valve seat 6 as a matter of course also when the damper 1 extends. Thus, when the valve body 7 is retracted, the motor 8 does not step out and the valve body 7 can be reliably positioned to a desired position.

When a damping force adjustment is made and a distance between the valve body 7 and the valve seat 6 is shortened to a desired distance to increase the damping force, the step-out of the motor 8 can be prevented by seating the valve body 7 on the valve seat 6 and then retracting the valve body 7 from the valve seat 6 to set the distance between the valve body 7 and the valve seat 6 to the desired distance.

Further, in this case, it is prevented to drive the valve body 7 in a direction to be seated on the valve seat 6 until the valve body 7 reaches a restricted position most distant from the valve seat 6. A drive pattern of the valve body 7 is as follows.

As shown in FIG. 4, when it is desired to set the damping force higher than the present damping force, the valve body 7 is retracted once from the valve seat 6 from the present position to a maximally retracted position (Step 1), then driven to the seated position to be seated on the valve seat 6 (Step 2) and retracted from the valve seat 6 in the seated state and driven to a desired position where a desired damping force is exerted (Step 3). That is, when it is desired to set the flow path area smaller than the present flow path area, the flow path 5 is blocked after the flow path area is maximized once and, thereafter, a control is executed to increase the flow path area and attain the desired flow path area.

On the contrary, when it is desired to set the damping force lower than the present damping force, the valve body 7 only has to be retracted from the valve seat 6 up to a position where a desired damping force is achieved. In this way, the valve body 7 is inevitably seated on the valve seat 6 once in the process of continuously pushing the valve body 7 toward the valve seat 6 against the flow of the liquid, wherefore the step-out of the motor 8 is corrected by this seating. In the case of retracting the valve body 7 from the valve seat 6, the fluid force and the pressure of the liquid passing along the flow path 5 act in the direction to retract the valve body 7 from the valve seat 6. Thus, the motor 8 does not step out at the time of retracting the valve body 7. In this way, the valve body 7 can be reliably positioned at a desired position.

Since the valve body 7 is inevitably seated on the valve seat 6 once in making an adjustment to increase the damping force, the step-out of the motor 8 is corrected and then the valve body 7 is retracted a desired distance. Thus, the damping force is adjusted in the absence of the step-out of the motor 8. Therefore, a desired damping force can be reliably generated in the damper 1.

In this embodiment, the valve body 7 is driven toward the valve seat 6 and seated thereon after being retracted from the valve seat 6 up to the maximally retracted position. Thus, even if the motor 8 largely steps out and the valve body 7 is not seated on the valve seat 6 for a certain reason, the motor 8 is energized to seat the valve body 7 on the valve seat 6 based on the maximally retracted position, wherefore the step-out of the motor 8 can be more promptly and reliably corrected.

Since the damping force adjustment mechanism V functions as a damping force generating element which permits the passage of the fluid along the flow path 5 and generates an extension side damping force of the damper 1 only during the extension of the damper 1 in the above description, the extension side damping force of the damper 1 can be adjusted. Instead of this, the damping force adjustment mechanism V may be caused to function as a damping force generating element which is so set that the flow path 5 permits the passage of the fluid only during the contraction of the damper 1 and generates a compression side damping force of the damper 1, and may adjust the compression side damping force.

In this case, if the compression side chamber R2, instead of the extension side chamber R1, communicates with the hollow portion 4*b* in the communication path 4*d* provided in the piston coupling portion 4*c*, the damping force adjustment mechanism V can adjust the compression side damping force. Since it can be set such that the liquid passes along the flow path 5 only when the damper 1 contracts in this way, the valve body 7 can be seated on the valve seat 6 if the motor 8 is energized to move the valve body 7 a distance which is two-fold or more of the distance to the seated position on the valve seat 6 in the same manner as described above. Thus, also in this case, the same functions and effects as the damper 1 set to allow the liquid to pass along the flow path 5 only at the time of extension can be achieved.

The following arrangement may be adopted instead of the arrangement of the damper 1 of this embodiment. A valve housing 9 including a valve seat 6 and housing a valve body 7 is provided on the leading end of a piston rod 4. A flow path 5 allows communication between an extension side chamber R1 or a compression side chamber R2 in a damper main body D and a reservoir R provided outside a cylinder 2 through the piston rod 4. Through the valve housing 9, the piston rod 4 in the damper main body D is coupled to a vehicle body side tube 10 coupled to a body of a saddled vehicle and the cylinder 2 is coupled to an axle side tube 11 coupled to a wheel of the saddled vehicle. A motor 8 is fixed to the valve housing 9 and arranged to project from the vehicle body side tube 10.

By this configuration, the valve body 7 can be driven without via a long control rod or the like and can be accurately driven to a desired position by arranging the valve body 7 and the motor 8 very close to each other. Thus, damping force controllability is improved, power feeding to the motor 8 from the outside is facilitated, and convenience and versatility are improved.

The structures of the valve body 7, the valve seat 6 and the flow path 5 in the damping force adjustment mechanism V are not limited to those described above. As long as the functions and effects of the present invention are achieved, the design can be changed or modified. For example, the valve body 7 is not limited to a needle valve and may be a poppet valve or the like.

The damper main body D may be configured to exert a damping force only at the time of extension when the damping force adjustment mechanism V exerts the damping force during the extension of the damper 1. Similarly, the damper main body D may be configured to exert a damping force only at the time of contraction when the damping force adjustment mechanism V exerts the damping force during the contraction of the damper 1.

The embodiments of the present invention described above are merely illustration of some application examples of the present invention and not of the nature to limit the technical scope of the present invention to the specific constructions of the above embodiments.

The present application claims a priority based on Japanese Patent Application No. 2010-256744 filed with the Japan Patent Office on Nov. 17, 2010, all the contents of which are hereby incorporated by reference.

INDUSTRIAL APPLICABILITY

This invention can be used for damper.

The invention claimed is:

1. A damper, comprising:
a damper main body including
    a cylinder,
    a piston which is slidably inserted into the cylinder to partition an interior of the cylinder into an extension side chamber and a compression side chamber, and
    a piston rod which is inserted into the cylinder to be coupled to the piston; and
a damping force adjustment mechanism including
    a flow path which permits a passage of a fluid during only one of
        extension of the damper main body, and
        contraction of the damper main body,
    a valve seat which is provided at an intermediate position of the flow path,
    a valve body which is movable back and forth relative to the valve seat, the valve body being movable between
        a maximally retracted position where the valve body is separated farthest from the valve seat, and
        a seated position where the valve body is seated on the valve seat, and
    a motor which drives and moves the valve body back and forth relative to the valve seat to adjust a flow path area of the flow path and blocks the flow path by moving the valve body from a present position, where the valve body is separated from the valve seat, to the seated position,
    wherein the motor is configured to drive the valve body for a period that corresponds to the valve body being moved by a distance which is two-fold or more of a distance from the present position to the seated position to ensure that the valve body is disposed on the valve seat.

2. The damper according to claim 1, wherein:
the motor is further configured to drive the valve body to the seated position and then retract the valve body from the valve seat to a desired distance, in a case of shortening a distance between the valve body and the valve seat to the desired distance.

3. The damper according to claim 1, wherein:
the motor is constituted by a stepping motor configured to retract the valve body to the maximally retracted position, drive the valve body to the seated position, and then retract the valve body from the seated position to a desired distance, in a case of shortening a distance between the valve body and the valve seat to the desired distance.

4. The damper according to claim 1, wherein:
the motor is constituted by a stepping motor configured to be energized for at least a period required to move the valve body a distance, which is two-fold of the distance from the present position to the seated position, in a case of blocking the flow path by moving the valve body from the present position to the seated position.

5. The damper according to claim 1, comprising:
a valve housing, including the valve seat, at a leading end of the piston rod and housing the valve body;
a vehicle body side tube to be coupled to a body of a saddled vehicle; and
an axle side tube to be coupled to a wheel of the saddled vehicle;
wherein:
the flow path penetrates through the piston rod and allows communication between
    the extension side chamber or the compression side chamber in the damper main body, and
    a reservoir provided outside the cylinder;
the piston rod is coupled to the vehicle body side tube via the valve housing and the cylinder is coupled to the axle side tube; and
the motor is fixed to the valve housing and arranged to project from an upper end opening of the vehicle body side tube.

6. A method comprising
providing a damper having
    a damper main body including
        a cylinder,
        a piston which is slidably inserted into the cylinder to partition an interior of the cylinder into an extension side chamber and a compression side chamber, and
        a piston rod which is inserted into the cylinder to be coupled to the piston; and
    a damping force adjustment mechanism including
        a flow path which permits a passage of a fluid during only one of
            extension of the damper main body, and
            contraction of the damper main body,
        a valve seat which is provided at an intermediate position of the flow path,
        a valve body which is movable back and forth relative to the valve seat, the valve body being moveable between
            a maximally retracted position where the valve body is separated farthest from the valve seat, and
            a seated position where the valve body is seated on the valve seat, and
        a motor which drives and moves the valve body back and forth relative to the valve seat to adjust a flow path area of the flow path; and
blocking the flow path by moving the valve body from a present position, where the valve body is separated from the valve seat, to the seated position by energizing the motor to drive the valve body for a period that corresponds to moving the valve body by a distance which is two-fold or more of a distance from the present position to the seated position to ensure the valve body is disposed on the valve seat.

* * * * *